United States Patent [19]

Hashizume et al.

[11] Patent Number: 4,930,714

[45] Date of Patent: Jun. 5, 1990

[54] REEL FOR A MAGNETIC TAPE

[75] Inventors: Kenji Hashizume, Nagano; Masatoshi Okamura, Saku; Haruo Shiba, Komoro, all of Japan

[73] Assignee: TDK Corporation, Tokyo, Japan

[21] Appl. No.: 335,940

[22] Filed: Apr. 10, 1989

[30] Foreign Application Priority Data

Apr. 19, 1988 [JP] Japan .............................. 63-52328[U]

[51] Int. Cl.⁵ .......................... G03B 1/04; B65H 75/18
[52] U.S. Cl. .................................. 242/71.8; 242/197; 242/71.9
[58] Field of Search ................... 242/68.5, 68.6, 71.8, 242/71.9, 118.4, 118.8, 115, 116, 197, 199

[56] References Cited

U.S. PATENT DOCUMENTS

| | | | |
|---|---|---|---|
| 4,262,856 | 4/1981 | Nakagawa | 242/71.8 |
| 4,403,749 | 9/1983 | Nakagawa | 242/71.8 |
| 4,515,322 | 5/1985 | Shiba | 242/71.8 |
| 4,520,969 | 6/1985 | Wulfing et al. | 242/71.8 |
| 4,564,156 | 1/1986 | Cybulski | 242/71.8 X |
| 4,664,328 | 5/1987 | Yamada | 242/71.8 |
| 4,752,046 | 6/1988 | Wulfing | 242/71.8 |

Primary Examiner—Donald Watkins
Attorney, Agent, or Firm—Oblon, Spivak, McClelland, Maier & Neustadt

[57] ABSTRACT

A reel for a magnetic tape comprises a hub in a cylindrical form with a boss at its upper surface, a lower flange formed at the lower part of the hub by one-piece molding, an upper flange with an aperture for allowing insertion of the boss, the upper flange being fitted to the hub, wherein the boss is formed in a tapered shape, and a fitting ring formed of the same material as the boss and having a fitting opening having a diameter smaller than the greatest diameter of the tapered boss. The fitting ring is mounted on the hub interposing the upper flange therebetween by inserting the boss in the fitting opening of the fitting ring and by connecting the inner circumference of the fitting opening to the outer periphery of the tapered boss by melt-bonding.

4 Claims, 5 Drawing Sheets

REEL FOR A MAGNETIC TAPE

BACKGROUND OF THE INVENTION

1. Field of the Invention

The present invention relates to a reel for a magnetic tape. More particularly, it relates to a reel comprising a flanged hub used for a magnetic tape cassette.

2. Discussion of Background

A magnetic tape is generally wound around a hub or a flanged hub in a magnetic tape cassette. In a magnetic tape cassette for video, the magnetic tape has to be more correctly wound and safely protected than a magnetic tape for audio. Accordingly, a flanged hub is usually used for a tape reel. The tape reel for video comprises a hub with a lower flange formed integrally therewith and an upper flange. A center boss is formed at the center of the upper surface of the hub, and a plurality of other bosses are arranged around the center boss in the same circle and at equal distances. A plurality of through holes are formed in the upper flange at positions corresponding to the center boss and other bosses. When the tape reel is assembled, the center boss and other bosses are inserted respectively in the center through hole and other holes, and the top of each of the bosses is melted by heat to thereby enlarge the tops, whereby the upper flange is firmly connected to the hub. In the conventional technique of connection using a method of caulking, it is difficult to correctly place each of the bosses on a jig for melting. If caulking operations are incomplete, a sufficient difference of height at the top portion of the center boss and other bosses can not be obtained. Since the tape reel is vertically movable in a range of clearance in the cassette casing, the tape reel may be lifted in operations and a leaf spring provided in the casing, which is used to press only the center boss, is elongated to thereby come in contact with the top of the other bosses. In this case, when the hub is rotated, powder is produced by the contact of the spring with the bosses; uneven rotation takes place or a phenomenon of drop out may occur; this results in erroneous recording or reproducing. Since the top of the bosses is visible through a transparent window formed in the upper half casing, insufficiently caulked bosses reduce the quality of the tape cassette.

The inventors of this application have proposed in Japanese Utility Model Application No. 154283/1987 a magnetic tape cassette having a construction as shown in FIGS. 6a and 6b wherein a hub 14 having a lower flange 10 formed in one-piece with the hub 14 and having a center boss 12 at the center of its upper surface is attached with an upper flange 20 having a center opening 16 to receive the center boss 12 and a plurality of fitting openings 18 formed around the center opening, and a fitting ring 24 made of the same material as the hub 14 and having a center opening 22 to receive the center boss 12 is mounted at the upper part of the hub 14 so as to interpose the upper flange 20 between the fitting ring 24 and the hub 14, followed by connecting the fitting ring 24 by means of the plurality of fitting openings 18 formed in the upper flange 20 by melt-bonding.

However, in the tape reel as proposed, a sufficient strength of connection can not be obtained in a stable manner because the lower surface of the fitting ring 24 is connected to the upper surface of the hub 14 by melt-bonding. In such tape reel, since a gap 26 is formed between the inner circumference of the center opening 22 and the outer periphery of the center boss 12, and a gap 28 is formed between the outer circumference of the fitting ring and the upper flange 20, there results eccentricity in position between the center boss 12 and the fitting ring 24 due to deviations at or during the melt-bonding operations. The eccentricity in position may cause disconnection of the fitting ring 24 from the hub 14 when the magnetic tape cassette is operated. The gap 26 serves to permit insertion of the center boss 12 in the center opening 22 of the fitting ring 24. The gap 28 serves to prevent any crack by a pressing force of the fitting ring 24 to the upper flange 20 when the fitting ring 24 is attached to the hub 14. The eccentric arrangement reduces the quality of the magnetic tape cassette because the tape reel is visible through a display window formed in the cassette.

SUMMARY OF THE INVENTION

It is an object of the present invention to provide a reel for a magnetic tape having an improved structure providing a strong bonding strength without causing eccentricity in position of the fitting ring to the hub.

The foregoing and other objects of the present invention have been attained by providing a reel for a magnetic tape which comprises a hub in a cylindrical form with a boss at its upper surface, a lower flange formed at the lower part of the hub by one-piece molding, an upper flange with an aperture for allowing insertion of the boss, the upper flange being fitted to the hub, wherein the boss is formed in a tapered shape, and a fitting ring formed of the same material as the boss and having a fitting opening having a diameter smaller than the greatest diameter of the tapered boss is mounted on the hub interposing the upper flange therebetween by inserting the boss in the fitting opening of the fitting ring and by connecting the inner circumference of the fitting opening to the outer periphery of the tapered boss by melt-bonding.

BRIEF DESCRIPTION OF DRAWINGS

FIG. 1 is a longitudinal cross-sectional view of an embodiment of a winding reel for a magnetic tape according to the present invention in which

FIG. 6 is a longitudinal cross-sectional view of a conventional reel in which

DETAILED DESCRIPTION OF PREFERRED EMBODIMENTS

Figure 1A:
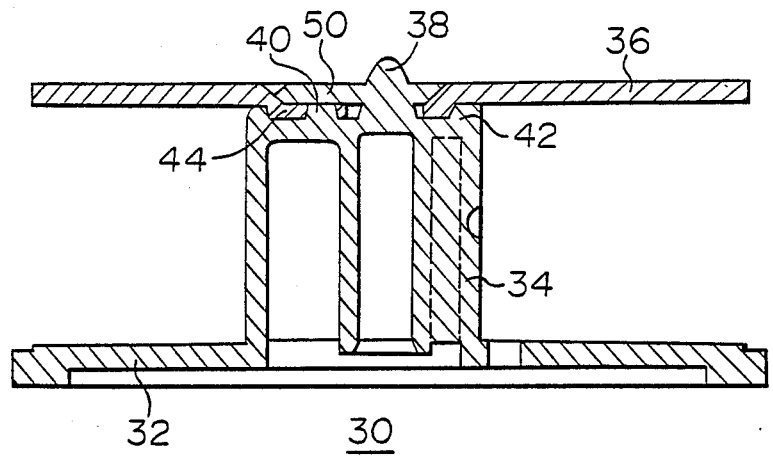
FIG. 1A is a cross-sectional view taken along a line A—A in FIG. 2
Figure 1B:
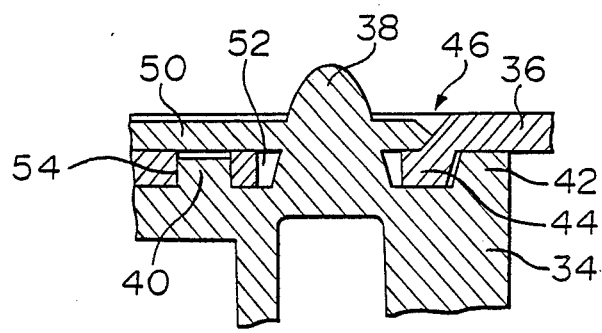
FIG. 1B is an enlarged cross-sectional view of an important part of the reel shown in FIG. 1A.
Figure 2:
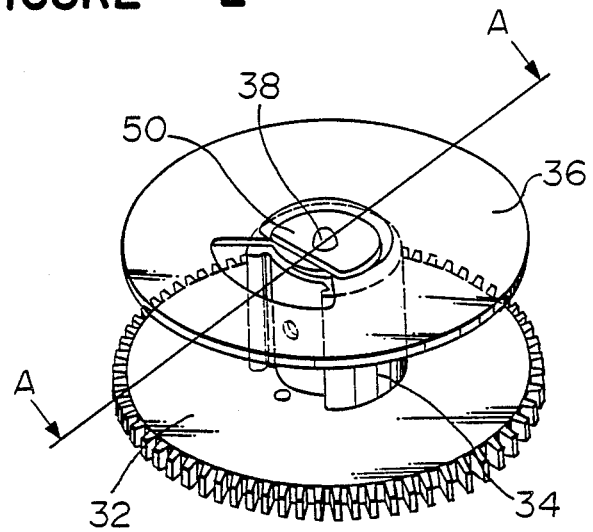
FIG. 2 is a perspective view of the reel as shown in FIG. 1.

Preferred embodiments of the reel for a magnetic tape of the present invention will be described with reference to the drawings. In FIGS. 1 and 2, a reference numeral 30 designates a reel for a magnetic tape which is placed at the winding side in a magnetic tape cassette. The reel 30 has a hub 34 in a cylindrical form which is provided with a disc-like lower flange 32 at its lower part and a disc-like upper flange 36. The lower flange 32 is formed integrally with the hub 34 by molding. A center boss 38 having a conical shape is formed at the center of the upper surface of the cylindirical hub 34 and a plurality of whirl-stop bosses 40 (in this embodiment, three bosses are shown) are formed on a circle line around the center boss 38 as its center. A fringed circular projection 42 is formed at the outer edge of the upper surface of the cylindrical hub 34. The upper flange 36 has a downwardly projecting central portion 44 which can be fitted to the upper surface surrounded by the fringed circular projection 42, and a recess 46 in a trapezoidal form at the upper part corresponding to the downwardly projecting central portion 44. At the downwardly projecting central portion 44, through holes are formed to receive the center boss 38 and the whirl-stop bosses 40 at positions corresponding thereto.

Figure 3:
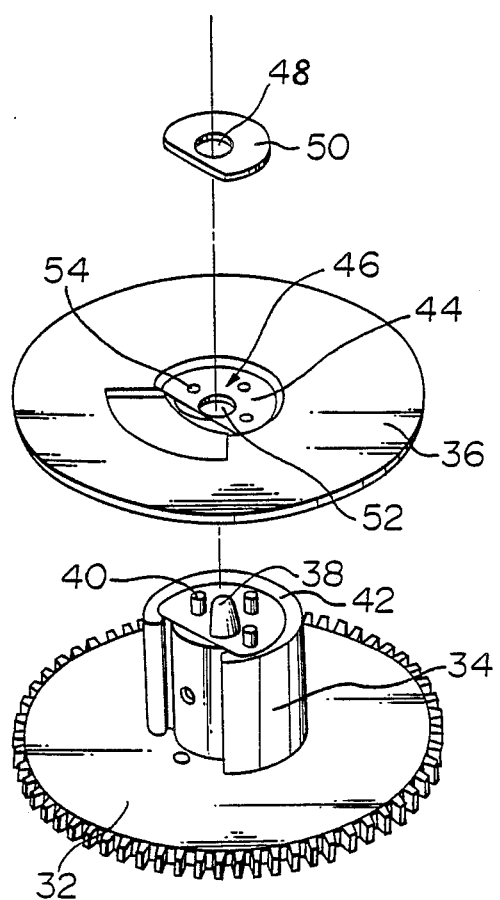
FIG. 3 is a perspective view showing a positional relation of each structural element in an assembling step.

In order to assemble the upper flange 36 with the hub 34, a fitting ring 50 made of the same material as the center boss 38 and having an opening 48 whose diameter (the width) is smaller than the diameter (the width) of the largest portion of the center boss 38, i.e. the diameter (the width) of the bottom portion of the conical center boss 38, as shown in FIG. 3 is used. The fitting ring 50 has upper and lower surfaces which are in parallel to each other, and the outer edges of the upper and lower surfaces are chamferred so that the fitting ring 50 can be used with either surface.

Assembling work of the reel is carried out as follows. Each of the structural elements of the reel is arranged as shown in FIG. 3; the upper flange 36 is mounted on the hub 34 so as to fit its central portion 44 to the upper surface area surrounded by the fringed circular projection 42; at the same time, the center boss 38 is inserted in a center opening 52; the whirl-stop bosses 40 are respectively fitted to connecting holes 54, and the fitting ring 50 is fitted into the recess 46 of the upper flange 36 while the center boss 38 is fitted to the opening 48 of the fitting ring 50. Since the diameter of the fitting opening 48 is smaller than the diameter of the largest portion of the center boss 38, the inner wall of the fitting opening 48 comes to close contact with the outer surface of the center boss 38 so that there is formed no gap, with the result that the center line of the fitting opening 48 is in agreement with the center line of the center boss 38. Then, melt-bonding operations are carried out to connect the inner wall of the fitting ring 50 to the outer surface of the center boss 38 by an ultrasonic method or by the application of heat so that the upper flange 36 is joined to the hub 34. When the inner wall of the fitting ring 50 and the outer surface of the center boss 38 are melted to join the ring 50 and the boss 38, the fitting ring 50 is urged toward the root of the center boss 38 so that the fitting ring 50 is joined to the center boss 38 near its root portion. In order to increase a bonding strength to the hub 34, the lower surface of the fitting ring 50 is melt-bonded to the upper surface of the hub 34 through a plurality of connecting holes 54 formed in the upper flange 36. A cut portion is formed in the hub 34, the upper flange 36 and the fitting ring 50 respectively, and a clamp for fixing a magnetic tape is mounted at the cut portions.

When the reel 30 is assembled, only the center boss 38 projects from the upper surface of the reel, and the connecting holes 54 formed around the center boss 38 are entirely covered by the fitting ring 50 as shown in FIG. 2. Further, there is no eccentricity of the fitting ring 50 to the center boss 8. As a result, strong connection is obtainable in a stable manner and the quality of appearance of the reel is excellent.

The above-mentioned description concerns the winding reel for a magnetic tape. However, the same description can be applied to a feeding reel.

Figure 4:
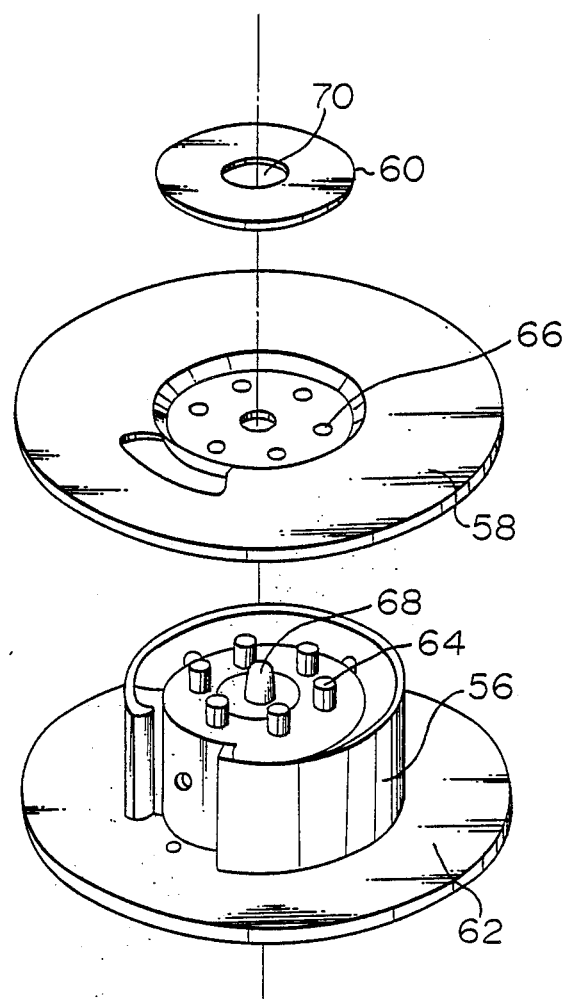
FIG. 4 is a perspective view showing a positional relation of each structural element of a supplying reel viewed in the same manner as FIG. 3.
Figure 6A:
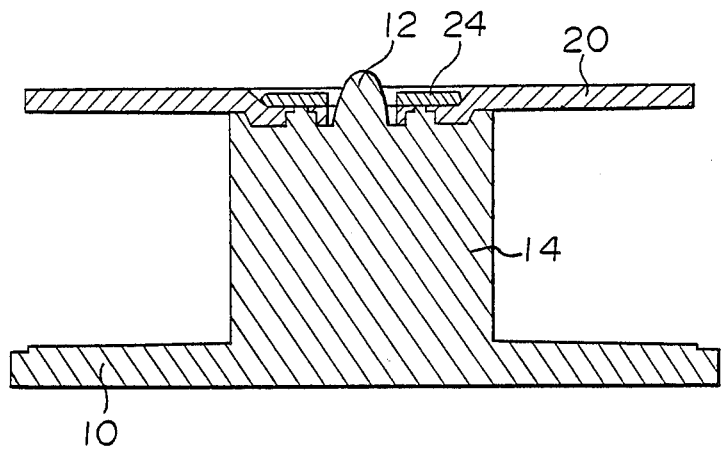
FIG. 6A is a cross-sectional view showing its entirety and FIG. 6B is an enlarged cross-sectional view of the reel.
Figure 6B:
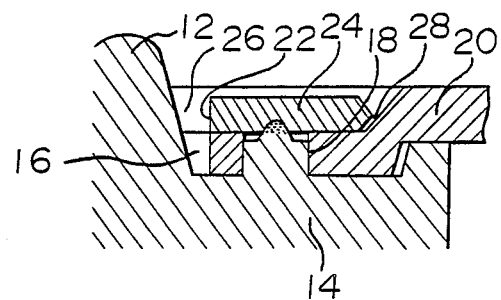

FIG. 4 shows a positional relationship of each of the structural elements of the feeding reel in correspondence to FIG. 3. In FIG. 4, the diameter of a hub 56, an upper flange 58 and a fitting ring 60 are respectively greater than that of the corresponding parts as shown in FIG. 3. In the hub 56, teeth are not formed at the outer periphery of a lower flange 62, and the number of whirl-stop bosses 64 is larger than the number of the whirl-stop bosses 40. The fitting ring 60 has no cut portion for allowing mounting of a clamp for fixing a magnetic tape. The fitting ring 60 is made of the same material as a center boss 68 of the hub 56 and has an opening 70 whose diameter is smaller than the diameter of the largest portion of the center boss 68. Accordingly, when the fitting ring 60 is connected to the center boss 68 by melt-bonding the inner wall of the fitting opening 70, the upper flange 58 is clamped by the fitting ring 60 and the hub 56 so that the upper flange 58 is firmly joined to the hub 56. Accordingly, there is no eccentricity of the fitting ring 60 to the center boss 68, and a strong connecting force is obtainable in a stable manner while the appearance of the reel is excellent.

Figure 5:
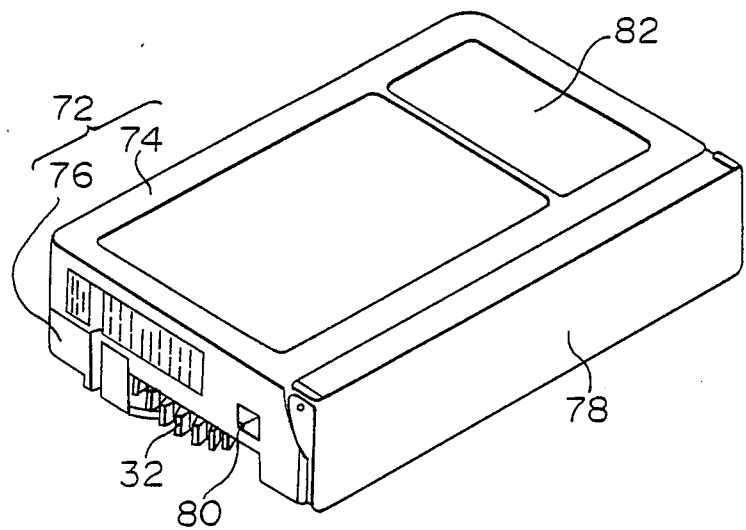
FIG. 5 is a perspective view of a magnetic tape cassette receiving therein winding and supplying reels realized by the application of the present invention.

FIG. 5 is a perspective view showing the appearance of an assembled VHS-C type magnetic tape cassette in which the reels prepared according to the present invention are installed. In FIG. 5, a cassette casing 72 comprises upper and lower half casings 74, 76. Inside the cassette casing 72, feeding and winding tape reels 30 around which a magnetic tape is wound are received with each of the center bosses 68, 38 being pressed down by a leaf spring attached to the inner surface of the upper half casing 74. A part of the lower flange 32 of the winding reel 30 projects outside from the casing 72. An opening formed at the front face of the casing 72 is covered by a guard panel 78 capable of opening and closing. The guard panel 78 is usually locked in a nonuse state so that the magnetic tape cassette is enclosed. However, when the cassette is mounted on a deck to use it, an operating bar 80 is pushed for unlocking thereby render the cassette to be an opened state. Then, the magnetic tape extending at the opening of the casing is exposed to thereby allow a loading operation. A quantity of magnetic tape wound on the feeding reel can be observed through a transparent window 82 which is formed at the right side of the upper surface of the upper half casing 74.

In the above-mentioned embodiment, a conical center boss has a convergent top. However, it may be formed in a pyramid form. The center boss or the whirl-stop bosses, or both the center boss and the whirl-stop bosses may be formed in a convergent shape. In this case, the fitting ring should be formed so as to correspond to these bosses.

As described above, in accordance with the present invention, the inner wall of the fitting opening of the fitting ring is connected to the a tapered boss or tapered bosses by melt-bonding. Accordingly, there is no possibility of occurrence of eccentricity. Accordingly, a stable bonding strength can be obtained and the appearance of the reel and the tape cassette becomes excellent.

Obviously, numerous modifications and variations of the present invention are possible in light of the above teachings. It is therefore to be understood that within the scope of the appended claims, the invention may be practiced otherwise than as specifically described herein.

What is claimed is:

1. A reel for a magnetic tape which comprises:
   a hub in a cylindrical form with an integral boss at its upper surface,
   a lower flange formed at the lower part of said hub by one-piece molding,
   an upper flange with an aperture for allowing insertion of said boss, the upper flange being fitted to said hub, wherein said boss is formed in a tapered shape, and a fitting ring formed of the same material as said boss and having a fitting opening having a diameter smaller than the greatest diameter of a tapered portion of said tapered boss is mounted on said hub with said upper flange interposed between said hub and said fitting ring by inserting said boss in the fitting opening of said fitting ring and by melt-bonding the inner circumference of the fitting opening to the outer periphery of said tapered boss.

2. The reel for a magnetic tape according to claim 1, wherein said tapered boss is a center boss.

3. The reel for a magnetic tape according to claim 2, wherein at least one boss is formed around said center boss and said fitting ring has at least one opening for fittingly receiving said at least one boss at the corresponding position.

4. The reel for a magnetic tape according to claim 3, wherein said at least one boss is tapered.

* * * * *